April 23, 1968 A. SLUITER 3,379,146
INCINERATOR HEATING SYSTEM
Filed March 18, 1966 2 Sheets-Sheet 1

INVENTOR.
ADRIAN SLUITER
BY
Kane, Dalsimer, Kane and Smith

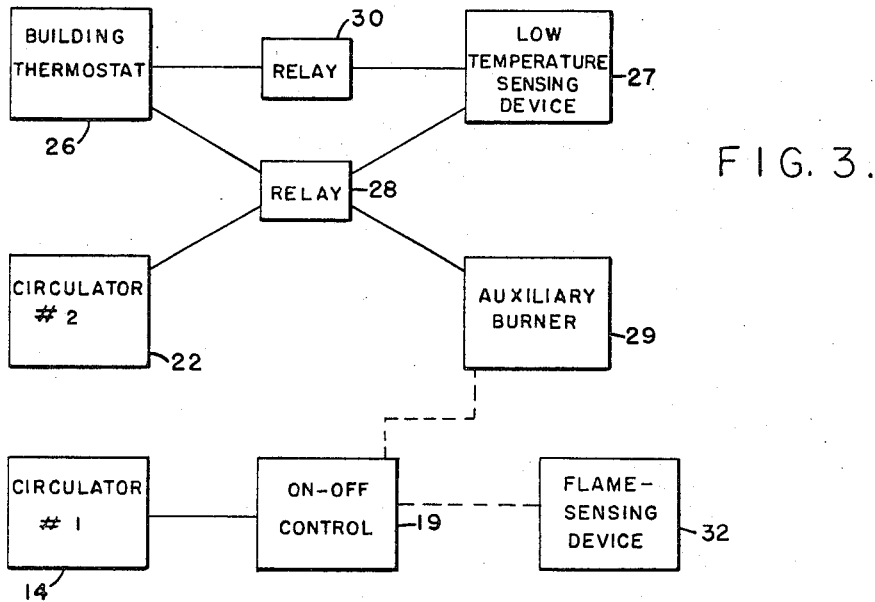
FIG. 3.
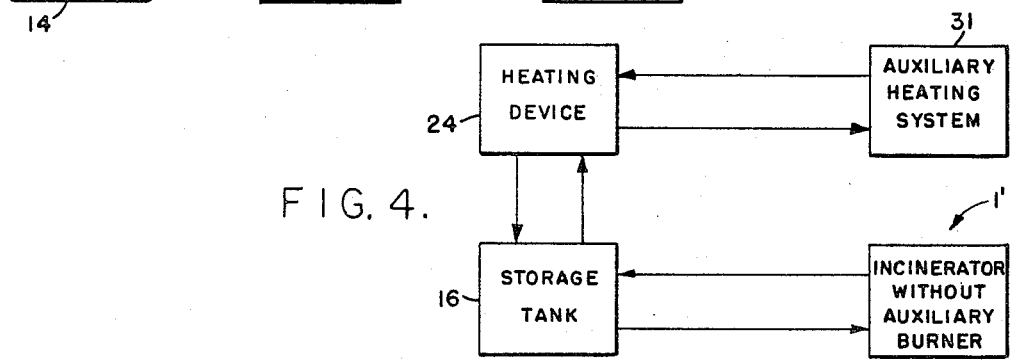
FIG. 4.
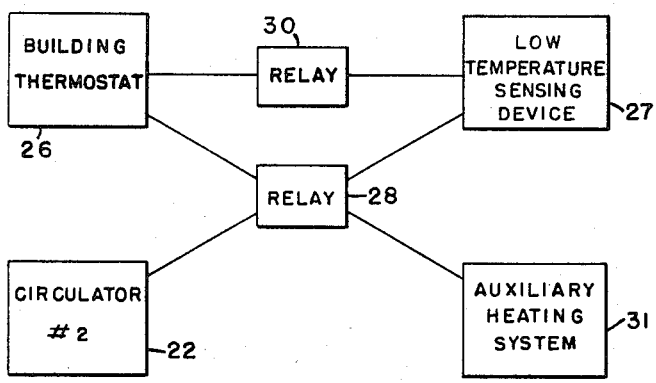
FIG. 5.
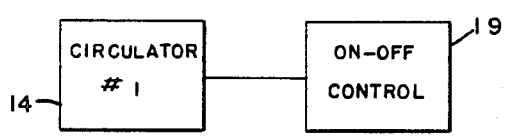
INVENTOR.
ADRIAN SLUITER
BY
Kane, Dalsimer, Kane
and Smith

United States Patent Office 3,379,146
Patented Apr. 23, 1968

3,379,146
INCINERATOR HEATING SYSTEM
Adrian Sluiter, Schenectady, N.Y., assignor to Central Markets, Inc., Schenectady, N.Y., a corporation of New York
Filed Mar. 18, 1966, Ser. No. 535,436
4 Claims. (Cl. 110—10)

ABSTRACT OF THE DISCLOSURE

An apparatus utilizing heat generated by the incineration of waste materials to raise the temperature of a heat transfer fluid by passing the heat transfer fluid through a heat exchanger suspended in the upper portion of the apparatus, transferring the heated fluid to a storage means and circulating the fluid from the storage means to a building heating means. A similar apparatus where circulation of the heat transfer fluid to the heat exchanger is controlled by a flame sensing device. A similar structure where means are provided to prevent cavitation of the fluid within the heat exchanger.

---

This invention relates to the utilization of heat generated by an incinerator, which heat is normally wasted. More particularly, this invention relates to the utilization of the heat generated in incineration for the purpose of supplying heat to a building.

The use of incinerators to dispose of waste material is known and these incinerators are often placed near the building in which the waste materials are generated. For example, it is common for supermarket food stores, which accumulate large quantities of waste material in the form of cardboard and wooden boxes, for example, to provide an incinerator adjacent the store. Depending upon the volume of waste generated, these incinerators are operated periodically and the resulting ash commercially disposed of. The heat which is generated by burning these waste materials, however, is normally allowed to be dissipated to the atmosphere. In situations where large amounts of burnable waste are generated, the amount of heat produced is often considerable and utilization of this heat could provide significant savings in other parts of the operation.

In accordance with the present invention, I have discovered a means whereby the heat generated in the incineration of waste materials can be advantageously employed in heating a structure.

A major object of this invention is to provide means for heating a building using the heat generated in an incinerator.

Another object of this invention is to provide means for utilizing the heat generated by the incineration of waste material for heating a structure.

A further object of this invention is to provide means for storing the heat generated by incineration prior to actual use in heating a structure.

An additional object of this invention is to provide for auxiliary heating means when the heat generated by incineration of waste materials is not sufficient, of itself, to supply all of the heating requirement of a structure.

A still further object of this invention is to provide a means for eliminating the necessity for use of the two combustion chambers which are generally required, at present, near buildings which have need for an incinerator, that is, an incineration for waste and a building heater.

To utilize the heat generated by the combustion of waste in an incinerator, a heat exchanger is provided in a zone of the primary chamber of the incenerator, located between the firebox and the flue stack. Heat transfer medium is circulated through this heat exchanger with a circular, such as a pump, which circulates the medium from the storage tank, provided to contain heated heat transfer medium, through the heat exchanger and back to the storage tank through a first fluid flow circuit. The heat transfer medium storage tank is provided with a second fluid flow circuit for connecting the storage tank with a device for providing usable heat to the structure to be heated. As the heat generated by the combustion of waste materials in the incinerator is generally not sufficient to supply the entire heating needs of a structure, some form of auxiliary apparatus must be provided. As part of this invention, one auxiliary method of supplying make-up heat is a gas or oil burner placed in the firebox of the incinerator which is activated by some sensing device placed in the incinerating heating system just described. Another method of supplying additional heat to the structure, also within the present invention, is to have an entirely separate heating system to supply heat transfer fluid to the device in the structure to be heated. Such an auxiliary heating system would also be activated by some type of sensing device in the incerator heating system. The use of an alternate heating system to supply heat, when that available from the incernator system is not sufficient, would be particularly advantageous where it is desired to convert an existing incinerator and an existing building heating system according to the present invention.

These and other objects and advantages of the invention will be better understood when considered in conjunction with the accompanying drawings, in which:

FIG. 3 is a block diagram of the electrical connections for an incinerator heating system employing an auxiliary burner;

FIG. 4 is a block diagram of an incinerator heating system employing an auxiliary heating system, rather than an auxiliary burner; and FIG. 5 is a block diagram of the electrical connections for the incinerator heating system of FIG. 4.

Figure 1:
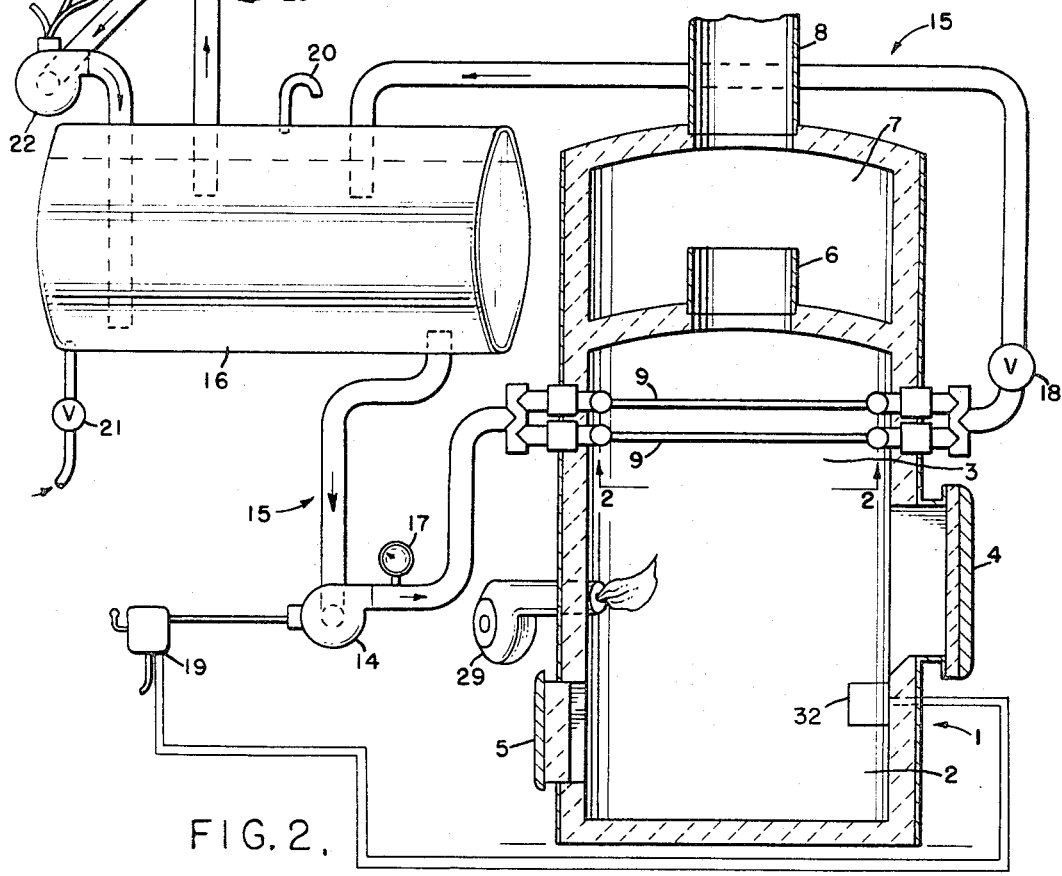
FIG. 1 is a schematic representation of a heating system employing an incinerator with the incenerator, having an auxiliary burner, in cross-section.
Figure 2:
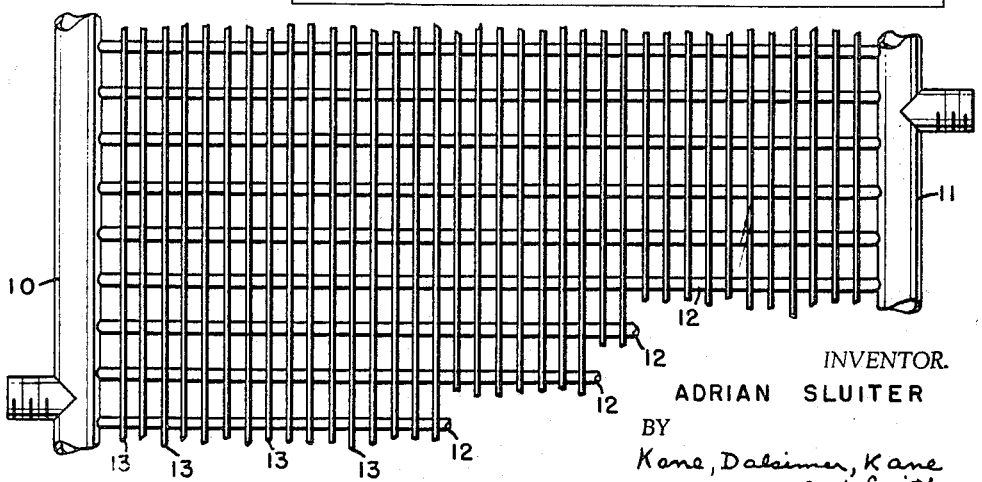
FIG. 2 is a plan view of the heat exchanger coil taken along the line 2—2 of FIG. 1.

The operation and construction of an incinerator heating system can be best understood from FIGS. 1-3, in which FIG. 1 shows an incinerator 1 with a primary chamber having a firebox 2 and an upper zone 3, a feedport for waste materials 4, an ash removal port 5, a flue stack 6, a soot collection chamber 7, and a smoke stack 8. Suspended in the upper zone 3 are heating coils 9, shown in greater detail in FIG. 2. Each coil, in this case two in number, has an inlet header 10, an outlet header 11, a plurality of pipes 12, connecting the two headers, for conveying the heat transfer medium, and a plurality of fins 13 to provide a better heat transfer between the rising hot combustion gases which flow around the pipes and the heat transfer medium within the pipes. Obviously, this type of pipe coil is only one of the types of commercially available heat exchangers which can be employed within the zone 3 of the primary chamber according to the present invention. The heat transfer between the rising hot gases and the heat exchange medium in the heat exchanger can be further improved, in some cases, by providing dampers (not shown) in the upper zone of the primary chamber. While any commercially available heat transfer fluid can be circulated through the pipe coil, the preferred medium is water for reasons of convenience and economy.

The inlet header of each heat exchange coil is in fluid flow relationship with a circulator 14 which acts to transfer the cool or tempered heat transfer medium through a first fluid flow circuit 15 from a storage tank 16 through the coils, and back to the storage tank. For best results, the cold or tempered heat exchange medium is taken from the bottom of the storage tank and the heated water from the pipe coil is returned to the top of the storage tank. Any of the commercially available devices can be employed as a circulator, but, for greatest efficiency, centrifugal pumps are preferred.

Advantageously, there is a pressure gauge 17 at the outlet of the circulator 14 and a metering valve 18 at the outlet of the coils. Heat transfer medium contained in the heat exchanger, which is suspended in the upper zone of the primary chamber of the incinerator, may have a tendency to vaporize and cause cavitation. This is particularly true when water is employed as the heat transfer medium and a water hammer can result. If this water hammer is allowed to develop, severe damage can be done both to the heat exchanger and to the incinerator, particularly those portions of the incinerator which are in contact with and act to suspend the heat exchanger. One method of avoiding cavitation is to install a metering valve on the outlet line of the heat exchanger and adjust the pressure at the outlet of the circulator 14 which circulates the water through the heat exchanger.

An on-off control 19 is electrically connected to the circulator 14, as shown in FIG. 3. This on-off control can take the form either of a manual switch, or of an automatic sensing device, such as a flame-sensing device 32 placed within the firebox of the incinerator, which controls an on-off relay connected to the circulator. While it is not economical for the circulator 14 to be operative at all times, it must be activated when heat is generated in the firebox of the incinerator to prevent the formation of vapor in the heat exchanger so as to cause cavitation. An on-off control can be used to activate the circulator, but an automatic device placed within the firebox is more advantageous. One method of providing such automatic control is the use of a flame-sensing device which would activate the circulator as soon as burning is started. Since heat would still be present in the incinerator chamber, at least for a short while, after termination of a burning operation, a time-delay device should be placed in the circuit between the flame-sensing device and the circulator so as to prevent damage to the incinerator from this latent heat. Obviously, other means can be employed, such as temperature sensing devices, etc.

The storage tank 16 is provided with a vent 20 which acts to prevent over-pressurizing of the tank. The tank is also provided with a valve 21 which can be an automatic control valve, for supplying make-up heat transfer medium to the storage tank so as to maintain a predetermined level of heat transfer medium in the tank. In connection with this valve, a gauge can be incorporated to show the height or quantity of heat transfer fluid in the tank at any given time.

A second circulator 22 acts to withdraw heated heat transfer medium from the storage tank, the heat transfer medium being circulated via a second fluid flow circuit 23 through a heating device 24 which acts to heat a structure 25, shown fragmentarily. As with the first circulator 14, the second circulator is also preferably a centrifugal pump. For best results in this second circuit, the heat transfer medium is taken from a point near the top of the tank and it is returned to a point near the bottom of the storage tank. The device to which the heat transfer medium is supplied in the structure to be heated can also be any of the conventional types. For example, it can be a standard pipe coil utilized to supply radiant heat to the room. Another type which can be utilized is a straight run or a smaller coil of pipe, generally finned, around which air is forced by some type of blower to supply hot air to the space to be heated.

The second circulator 22 is controlled by a temperature sensing device 26, which can be any of the standard thermostat systems used to control building heating systems. A low temperature sensing device 27 is placed in communication with the heat transfer medium being returned from the heating device 24 to the storage tank. This low-temperature sensing device can be placed in direct contact with the heat transfer medium, such as within the conduit, or can be placed along the outside of the conduit carrying the heat transfer medium. As shown in FIG. 3, this low-temperature sensing device 27 acts, through relay 28, to energize auxiliary burner 29, placed within the firebox of the incinerator. Similarly, the low-temperature sensing device acts in cooperation with the building thermostat 26 through a relay 30. Thus, should the temperature of the heat transfer medium being returned to the storage tank become too low to adequately heat the structure, the low-temperature sensing device will energize the auxiliary burner so as to provide additional heat to the heat transfer medium. The auxiliary burner can also be in electrical connection with the on-off control 19 to activate circulator 14 when the auxiliary burner is in operation. It is also possible, if desired, to have the auxiliary burner activated by the sensing device placed in the firebox of the incinerator, such as the flame-sensing device 32 previously described, so that the auxiliary burner is energized when waste material is not being burned in the firebox, while also having the flame-sensing device activate circulator 14. Similarly, a temperature sensing device may be placed in the heat transfer medium storage tank to activate the auxiliary burner when the temperature of the medium in the storage tank falls below some predetermined level. Obviously, a flame-sensing device and a temperature sensing device in the storage tank can be interconnected for control of the auxiliary burner. The type of fuel supplied to the auxiliary burner is not critical and forms no part of the present invention. Methods of employing and wiring such burners are well known in the art.

In this system only one combustion chamber, the incinerator is required. Thus, the need for two combustion chambers, a boiler and an incinerator, as with present systems, is eliminated.

A block diagram for an incinerator heating system which employs an auxiliary building heating system, rather than an auxiliary burner, is shown in FIG. 4, and its electrical connections in FIG. 5. In general, this system is very similar to the incinerator heating system just described and shown in FIGS. 1–3. Cooled or tempered heat transfer medium is circulated from a storage tank 16 to an incinerator 1' equipped with heating coils, and returned to the storage tank, as shown in FIG. 1. The incinerator 1' differs from the incinerator 1 in that it is not provided with an auxiliary burner. The heated heat transfer medium is circulated from the storage tank to a heating device 24 placed in the structure to be heated and recirculated to the storage tank, again as in FIG. 1. The conduit which carries the heat transfer medium from the heating device to the storage tank again can incorporate a low-temperature sensing device. In this case, however, rather than energizing an auxiliary burner in the incinerator, an auxiliary heating system for the building is energized when the temperature of the heat transfer medium in this conduit drops below some predetermined level, for example, 80° F. This is shown in FIG. 5 in which the electrical connections for the incinerator heating system of FIG. 4 are represented. It can be seen that the electrical system is also essentially the same as that described for the incinerator heating system with an auxiliary burner, except that the auxiliary heating system 31 is energized by the low-temperature sensing device 27 through the relay 28, rather than the auxiliary burner. This means of supplying make-up heat by an auxiliary heating system can be advantageously employed when it is desired to utilize the heat generated by the combustion of waste in the incinerator where the structure to be heated is already provided with any of the commercially available heating systems. Thus, the method of installation and wiring of such heating systems is well known to the art.

In operating the incinerator heating system with the auxiliary burner, as shown in FIGS. 1-3, waste material is fed into the feedport of the incinerator and ignited. The heat generated by the combustion of this waste material heats a heat transfer medium which is circulated through a heat exchanger suspended in the upper zone of the primary chamber of the incinerator, and this heated heat transfer medium is circulated to a storage tank. The heated heat transfer medium is circulated from the storage tank into a device for heating a structure and is then returned to the storage tank. Additional heat transfer medium is fed to the storage tank to maintain a predetermined level and, should the level rise in the storage tank, or should excessive vapor be generated, the storage tank is equipped with a vent to relieve the excess pressure or excess fluid. When the temperature of the heat transfer medium returning from the heating device to the storage tank falls below a predetermined level, a low-temperature sensing device energizes an auxiliary burner, which is in the firebox of the incinerator, the heat transfer medium being circulated as when heat is derived from the combustion of waste materials. When the incinerator heating system employs an auxiliary heating system rather than an auxiliary burner, operation is essentially the same. However, here when the temperature of the heat transfer medium falls below a similar predetermined level, the low-temperature sensing device will energize this auxiliary heating system. This auxiliary heating system may supply heat through the same heating device as employed for the incinerator heating system, or to a portion of the device, or may employ entirely separate heating devices. In the preferred embodiment, no matter what type of auxiliary system is employed, the heat exchanger in the upper zone of the primary chamber of the incinerator is a finned type coil.

While specific embodiments of this invention have been shown and described, it should be understood that many variations are possible, and these descriptions are not meant to limit the full scope of this invention as covered in the appended claims.

I claim:

1. An incinerator heating system for supplying heat to a structure comprising:
   (a) an incinerator having a primary chamber and having a fire box in the lower portion of said chamber;
   (b) a heat exchanger suspended in the upper zone of said primary chamber;
   (c) a storage tank for containing heat transfer medium,
   (d) a first fluid flow circuit connecting said heat exchanger and said storage tank,
   (e) a circulator for circulating heat transfer medium through said first fluid flow circuit between said heat exchanger and said storage tank;
   (f) a heater device for supplying heat to said structure;
   (g) a second fluid flow circuit connecting said storage tank and said heater device;
   (h) a second circulator for circulating heat transfer medium through said second fluid flow circuit between said storage tank and said heater device;
   (i) an auxiliary burner located within the upper portion of the fire box of said incinerator for supplying heat when the heat derived from the combustion of waste materials is insufficient for heating said structure; and
   (j) a low temperature sensing device in said second fluid flow circuit for activating said auxiliary burner, said sensing deivce being located on the portion of said circuit wherein the heat transfer medium is returned from the heater device to the storage tank.

2. An incinerator heating system for supplying heat to a structure comprising:
   (a) an incinerator having a primary chamber and having a fire box in the lower portion of said chamber;
   (b) a heat exchanger suspended in the upper zone of said primary chamber;
   (c) a storage tank for containing heat transfer medium;
   (d) a first fluid flow circuit connecting said heat exchanger and said storage tank;
   (e) a circulator for circulating heat transfer medium through said first fluid flow circuit between said heat exchanger and said storage tank;
   (f) a heater device for supplying heat to said structure;
   (g) a second fluid flow circuit connecting said storage tank and said heater device;
   (h) a second circulator for circulating heat transfer medium through said second fluid flow circuit between said storage tank and said heater device;
   (i) an auxiliary building heating system for providing heat when the heat derived from the combustion of waste materials is insufficient for heating said structure; and
   (j) a low temperature sensing device in said second fluid flow circuit for activating said auxiliary building heating system, said sensing device being located on the portion of said circuit wherein the heat transfer medium is returned from the heater device to the storage tank.

3. An incinerator heating system for supplying heat to a structure comprising:
   (a) an incinerator having a primary chamber and having a fire box in the lower portion of said chamber;
   (b) a heat exchanger suspended in the upper zone of said primary chamber;
   (c) a storage tank for containing heat transfer medium;
   (d) a first fluid flow circuit connecting said heat exchanger and said storage tank;
   (e) a circulator for circulating heat transfer medium through said first fluid flow circuit between said heat exchanger and said storage tank;
   (f) a metering valve placed at the outlet of said heat exchanger in said first fluid flow circuit to prevent cavitation in said heat exchanger;
   (g) a heater device for supplying heat to said structure;
   (h) a second fluid flow circuit connecting said storage tank and said heater device; and
   (i) a second circulator for circulating heat transfer medium through said second fluid flow circuit between said storage tank and said heater device.

4. An incinerator heating system for supplying heat to a structure comprising:
   (a) an incinerator having a primary chamber and having fire box in the lower portion of said chamber;
   (b) a heat exchanger suspended in the upper zone of said primary chamber;
   (c) a storage tank for containing heat transfer medium;
   (d) a first fluid flow circuit connecting said heat exchanger and said storage tank;

(e) a circulator for circulating heat transfer medium through said first fluid flow circuit between said heat exchanger and said storage tank;
(f) a flame-sensing device located in the fire box of said incinerator for activating said circulator;
(g) a heater device for supplying heat to said structure;
(h) a second fluid flow circuit connecting said storage tank and said heater device; and
(i) a second circulator for circulating heat transfer medium through said second fluid flow circuit between said storage tank and said heater device.

References Cited

UNITED STATES PATENTS

| | | | |
|---|---|---|---|
| 1,160,360 | 11/1915 | Atterbury et al. | 110—8 |
| 1,734,310 | 11/1929 | Taylor. | |
| 2,469,496 | 5/1949 | Christenson | 237—1 |
| 3,251,345 | 5/1966 | Brody et al. | 122—2 |

FOREIGN PATENTS 826,279  12/1959  Great Britain.

JAMES W. WESTHAVER, *Primary Examiner.*
FREDERICK L. MATTESON, JR., *Examiner.*